United States Patent
Sauter et al.

(10) Patent No.: US 9,381,808 B2
(45) Date of Patent: Jul. 5, 2016

(54) METHOD FOR DECOUPLING A POWER TAKE-OFF OF A MOTOR VEHICLE TRANSMISSION WHILE DRIVING A MOTOR VEHICLE

(71) Applicant: ZF Friedrichshafen AG, Friedrichshafen (DE)

(72) Inventors: Ingo Sauter, Meckenbeuren (DE); Thomas Hafen, Salem (DE); Melchor Moro-Oliveros, Riva del Garda (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 65 days.

(21) Appl. No.: 14/447,845

(22) Filed: Jul. 31, 2014

(65) Prior Publication Data

US 2015/0039182 A1    Feb. 5, 2015

(30) Foreign Application Priority Data

Aug. 2, 2013 (DE) .......................... 10 2013 215 249

(51) Int. Cl.
*G06F 7/00* (2006.01)
*B60K 25/06* (2006.01)
*B60K 17/28* (2006.01)

(52) U.S. Cl.
CPC ................. *B60K 25/06* (2013.01); *B60K 17/28* (2013.01); *B60Y 2300/423* (2013.01); *Y10T 477/6403* (2015.01)

(58) Field of Classification Search
CPC ... B60K 25/06; B60K 17/28; B60Y 2300/423
See application file for complete search history.

(56) References Cited

U.S. PATENT DOCUMENTS

2011/0093147 A1*  4/2011  Kaltenbach ............ F02N 11/08
701/22

(Continued)

FOREIGN PATENT DOCUMENTS

| DE | 10 2008 040 757 A1 | 2/2010 |
| DE | 10 2010 002 724 A1 | 9/2011 |
| WO | 2004/041576 A1 | 5/2004 |

OTHER PUBLICATIONS

German Search Report Corresponding to 10 2013 215 249.3 mailed Mar. 28, 2014.

*Primary Examiner* — David J Hlavka
(74) *Attorney, Agent, or Firm* — Davis & Bujold PLLC; Michael J. Bujold

(57) ABSTRACT

A method of decoupling a power take-off drive of a motor vehicle transmission during travel of a motor vehicle in which a form-locking shift element of the power take-off drive is controlled for disengaging the power take-off drive. To implement reliable decoupling without interrupting travel of the motor vehicle, if disengagement of the shift element initially did not occur, control of the shift element is immediately implemented the next time a separating clutch, placed between the motor vehicle transmission and a drive engine of the motor vehicle, is actuated and/or a connection of the shift element toward an output side of the motor vehicle transmission is interrupted, over the course of a subsequent gear shift in the motor vehicle transmission. A drive train of a motor vehicle, a computer program product, and a data carrier having the computer program product.

11 Claims, 4 Drawing Sheets

(56) References Cited

U.S. PATENT DOCUMENTS

| | | | | |
|---|---|---|---|---|
| 2011/0198140 A1* | 8/2011 | Wallner | ................ | B60K 6/365 180/65.28 |
| 2011/0219900 A1 | 9/2011 | Schneider et al. | | |
| 2011/0224855 A1* | 9/2011 | Schneider | .............. | B60K 17/28 701/22 |
| 2012/0158232 A1* | 6/2012 | Banerjee | ................ | B60K 25/00 701/22 |
| 2012/0266701 A1* | 10/2012 | Yamada | ................ | B60K 6/383 74/15.82 |
| 2013/0292195 A1* | 11/2013 | Gibson | .................... | B60K 6/48 180/53.1 |

* cited by examiner

METHOD FOR DECOUPLING A POWER TAKE-OFF OF A MOTOR VEHICLE TRANSMISSION WHILE DRIVING A MOTOR VEHICLE

This application claims priority from German patent application serial no. 10 2013 215 249.3 filed Aug. 2, 2013.

FIELD OF THE INVENTION

The invention relates to a method for decoupling a power take-off drive of a motor vehicle transmission during travel of a motor vehicle, wherein a form-locking shift element of the power take-off drive is controlled and thereby disengaged. The invention also relates to a drive train of a motor vehicle, a computer program product, and a data carrier comprising the computer program product.

BACKGROUND OF THE INVENTION

Transmissions of commercial vehicles, in particular, often comprise power take-off drives, by means of which auxiliary assemblies of the particular commercial vehicle can be engaged at an auxiliary output of the particular transmission and operated. During operation of these auxiliary assemblies, which can be present in the form of hydraulic pumps, cutter bar mowers, refuse compactors, etc., for example, depending on the type of commercial vehicle, a corresponding drive torque is tapped via the respective power take-off drive. In order to implement an appropriate coupling and decoupling of the power take-off drive, a shift element is usually dedicated to the power take-off drive, wherein such shift elements are usually embodied as form-locking shift elements, such as claw clutches, for example.

In addition to stationary power take-off drives, via which a particular auxiliary assembly can be operated only when the vehicle is at a standstill, motor vehicle transmissions of commercial vehicles are often also equipped with non-stationary power take-off drives, via which a corresponding auxiliary assembly can also be operated during travel of the motor vehicle. Since the permissible operating range of auxiliary assemblies is usually limited, however, engagement of a non-stationary power take-off drive is permitted only in certain transmission ratios of the transmission and, in addition, a gear shift during operation of the non-stationary power take-off drive is prevented. Although coupling of a non-stationary power take-off drive can be implemented during travel of the particular motor vehicle, decoupling thereof is usually possible only when the vehicle is at a standstill, since the torque-loaded, form-locking shift element is difficult to disengage in a traction mode or even a thrust mode of the motor vehicle. The reason is that an internal friction of the shift element that prevails during transfer of the torque holds the shift element in the engaged position and prevents successful disengagement, provided the friction exceeds an actuating force that can be applied.

Document DE 10 2008 040 757 A1 makes known a method for decoupling a power take-off drive of a transmission, wherein, over the course of decoupling, a form-locking shift element of the power take-off drive is controlled so as to disengage. This is permitted during travel of the particular motor vehicle only in exceptional cases, however, such as in the case of serious transmission errors, for example. A decoupling of this type can then be implemented even in the absence of a previous command from a vehicle driver.

SUMMARY OF THE INVENTION

Proceeding from the above-described prior art, the problem addressed by the present invention is that of creating a method for decoupling a power take-off drive of a motor vehicle transmission, wherein, by means of this method, reliable decoupling can be implemented without interrupting travel of a motor vehicle. Another problem addressed by the present invention is that of creating a drive train of a motor vehicle, in which the aforementioned method can be implemented.

According to the invention, in a method for decoupling a power take-off drive of a motor vehicle transmission during travel of a motor vehicle, a form-locking shift element of the power take-off drive is controlled so as to disengage and, therefore, to decouple the power take-off drive. In this case, the motor vehicle transmission is part of a drive train of the motor vehicle, wherein an auxiliary assembly, such as a refuse compactor, a cutter bar or the like, can be operated via the power take-off drive during travel of the motor vehicle. The power take-off drive is therefore designed as a non-stationary power take-off drive.

The motor vehicle transmission according to the invention is an automatic transmission, which can be designed, in particular, as an automatic transmission, an automatic torque-converter transmission, a continuously variable, power-branched transmission, etc. The motor vehicle transmission can also comprise a plurality of transmission groups by disposing a splitter group upstream or downstream of a main group and/or disposing a range group downstream of a main group. The motor vehicle in which a motor vehicle transmission according to the invention is used is preferably a commercial vehicle, such as a truck or a municipal or agricultural vehicle, such as a tractor. The form-locking shift element is embodied in particular as a claw clutch, although this could just as well be embodied as locking synchronization.

The invention comprises the technical teaching that, in the event that disengagement of the shift element initially did not take place, control of the shift element is immediately implemented nevertheless the next time a separating clutch placed between the transmission and a drive engine of the motor vehicle is actuated and/or a connection of the shift element toward an output side of the transmission is interrupted by a shift in the transmission. In other words, in the event that the form-locking shift element initially does not disengage when controlled, the control is immediately implemented nevertheless the next time a separating clutch located between the transmission and a drive engine of the motor vehicle is controlled. As an alternative or in addition thereto, the shift element is also controlled as soon as a power flow of the region of the placement of the form-locking shift element in the transmission is separated toward an output side of the transmission by means of a corresponding shift in the transmission.

An embodiment of this type has the advantage that, by means of both of the individual measures or the combination of the two, the drive train can be relieved in the region of the form-locking shift element of the power take-off drive to the extent that the shift element can be disengaged with the available shift force. For example, it can be sufficient, under certain circumstances, if the transmission is separated from the drive engine of the motor vehicle only on the drive side and, as a result, a loading of the drive train when switching from the traction mode to the thrust mode takes place only in the form of the drag torque of the motor vehicle and the drive assembly, which is still coupled. Load relief that is sufficient for reliably disengaging the form-locking shift element of the power take-off drive can be achieved, in particular, by means of drive-side decoupling via the separating clutch and interrupting the power flow toward the output side of the transmission by means of a corresponding shift in the transmission.

In the case of DE 10 2008 040 757 A1, however, decoupling of a power take-off drive can be implemented only in exceptional cases, for example in the event of serious transmission errors. The manner in which a decoupling procedure of this type can take place is not described in greater detail in DE 10 2008 040 757 A, however.

The expression that control of the shift element is "nevertheless" carried out is intended to mean, within the scope of the invention, that control of the shift element was not interrupted after control was carried out for the first time, i.e. repeated attempts were made to disengage the shift element. This is also intended to mean, however, that control of the shift element is implemented once more, i.e. the control of the shift element was temporarily interrupted starting with the first attempt.

According to the invention, the control of the shift element is also preferably implemented in response to a command by a vehicle driver to decouple the power take-off drive. As an alternative, the control can even be initiated in the event that decoupling must be forcibly implemented, for example in the event of serious transmission errors. In the event that the power take-off drive is decoupled in response to a command by the vehicle driver, in particular, if the shift element initially does not disengage, an error message is not output and a protective mode of the transmission is not activated, in order to initially not limit drivability of the motor vehicle and to allow the further measures according to the invention for decoupling the power take-off drive to be implemented. The initially continued operation of the particular auxiliary assembly via the power take-off drive is a problem, since driving continues in the transmission ratio that is suitable for operation of the auxiliary assembly. If a gear shift is then implemented, the shift element is disengaged by means of the measures according to the invention during the course of this next gear shift, at the latest.

In the event that the motor vehicle transmission is embodied as a transmission in which gear shifts can normally be implemented under load and, therefore, without interruption of tractive force, a subsequent gear shift is then implemented by means of a corresponding control, in particular with interruption of the tractive force, in order to obtain the desired load relief of the drive train in the region of the shift element.

According to an embodiment of the invention, after the shift element is controlled for the first time, successful disengagement thereof is queried, wherein, in the event that disengagement of the shift element has initially not taken place, control is interrupted for the time being and control is reimplemented immediately the next time the separating clutch is actuated and/or the connection of the shift element toward the output side is interrupted. The temporary interruption of the control has the advantage that wear of an operating device of the shift element is reduced. As is further preferable, a waiting period of a predefined time interval ensues between the control of the shift element for the first time and the query regarding disengagement. Initially a wait ensures to determine whether the power take-off drive can be decoupled without further measures, possibly after a correspondingly long attempt, over the course of the first control, and therefore, under certain circumstances, the further measures can be omitted within the framework of an actuation of the separating clutch and/or a shifting in the transmission.

In a development of the invention, in the event that the transmission has a group design and the shift element is disposed in a countershaft of a main group, over the course of the next gear shift, a shift into neutral is implemented in the main group and/or a range group of the transmission disposed downstream of the main group. In the case of a thusly designed motor vehicle transmission, a shift into neutral in the main group or in the downstream range group results in a desired load relief of the drive train in the region of the shift element of the power take-off drive, and therefore said shift element can be designed to be corresponding lightweight. Under certain circumstances, the next gear shift in the motor vehicle transmission should be implemented in a modified manner, wherein the aforementioned shift into neutral is implemented even in the event that a shift in the main group and/or in the range group actually need not be implemented. As a result, although the duration of the next gear shift is extended under certain circumstances, the case is reliably prevented in which a switch is made from a gear that is permissible for the operation of the auxiliary assembly into a subsequent gear—the transmission ratio of which is unsuitable for the auxiliary assembly—without a corresponding shift into neutral and opportunity to disengage the power take-off drive.

Particularly preferably, in the case of the aforementioned embodiment, an attempt is made first to shift into neutral in the main group, wherein this cannot be completed, under certain circumstances, because the auxiliary assembly is still running as well, in particular in the case of an unsynchronized main group. If a shift into neutral therefore cannot be implemented in the main group due to the additional drag torque of the auxiliary assembly, the next step is to implement a shift into neutral in the downstream range group. Since less shift forces are usually necessary in the region of the range group, this can result in the desired interruption of the connection between the shift element of the power take-off drive and the output side of the transmission.

For the case in which a shift force that can be applied at shift elements in transmission ratio steps can be varied in the particular transmission, it is provided within the scope of a further embodiment of the invention that the shift force of the shift interrupting the connection of the shift element toward the output side is set to a maximum over the course of the next gear shift. This increases the possibility that the corresponding shift can be implemented despite the drag torque of the auxiliary assembly, which is still present.

According to a further advantageous embodiment of the invention, the separating clutch is engaged, over the course of the subsequent actuation, up to the point that a drive torque compensates for a drag torque. As a result, the drive train can be designed to be virtually torque-free in the region of the shift element to be disengaged by virtue of the fact that a torque supplied on the drive side compensates for a drag torque, i.e. a drag torque of the motor vehicle and a drag torque of the concurrently running auxiliary assembly. Particularly preferably, a thusly regulated slip mode of the separating clutch upon engagement is completed at the end of a subsequent gear shift in the transmission. This can be applied in combination with the above-described variants, that is, if a corresponding shift could not be implement in the transmission, possibly even with maximum shift force. Under certain circumstances, an engine control of the drive engine can also be specifically accessed in this case for ensuring that the drive engine can provide sufficient torque. This can be easily implemented over the course of a transmission control device of an automatic transmission accessing the particular engine control unit, since the transmission control device acts on the engine control device in an instructive manner anyway within the scope of a gear shift.

As an alternative thereto, a corresponding compensation of a drag torque with a drive torque can also be implemented, however, by disengaging the separating clutch in a controlled manner accordingly over the course of the operation thereof. An adequate slip mode can also be implemented here such that a torque-free or virtually torque-free drive train is obtained in the region of the shift element to be disengaged. This can also be carried out over the course of a subsequent gear shift of the transmission or even independently of a gear shift, wherein, in the latter case, the comfort of the vehicle driver is reduced, however, since the traction force of the motor vehicle is briefly interrupted after a gear shift.

In both of the aforementioned cases, regulation of the separating clutch can also be carried out in accordance with a calculated drag torque of the motor vehicle and the power take-off drive, since the data required for this is typically available to the transmission control device.

The solution according to the invention can also be embodied as a computer program product, which, when running on a processor of a transmission control device, instructs the processor from the software point of view to execute the dedicated method steps, which are subjects of the invention. In this context, a machine-readable medium, on which an above-described computer program product is retrievably stored, is also a subject of the invention.

The invention is not limited to the specified combination of features of the independent claims or the claims dependent thereon. In addition, individual features can be combined with one another, provided they arise from the claims, the description of embodiments that follows, or directly from the drawings. References in the claims to the drawings via the use of reference characters is not intended to limit the scope of protection of the claims.

BRIEF DESCRIPTION OF THE DRAWINGS

Advantageous embodiments of the invention, which are explained in the following, are represented in the drawings. In the drawings.

DETAILED DESCRIPTION OF THE PREFERRED EMBODIMENTS

Figure 1:
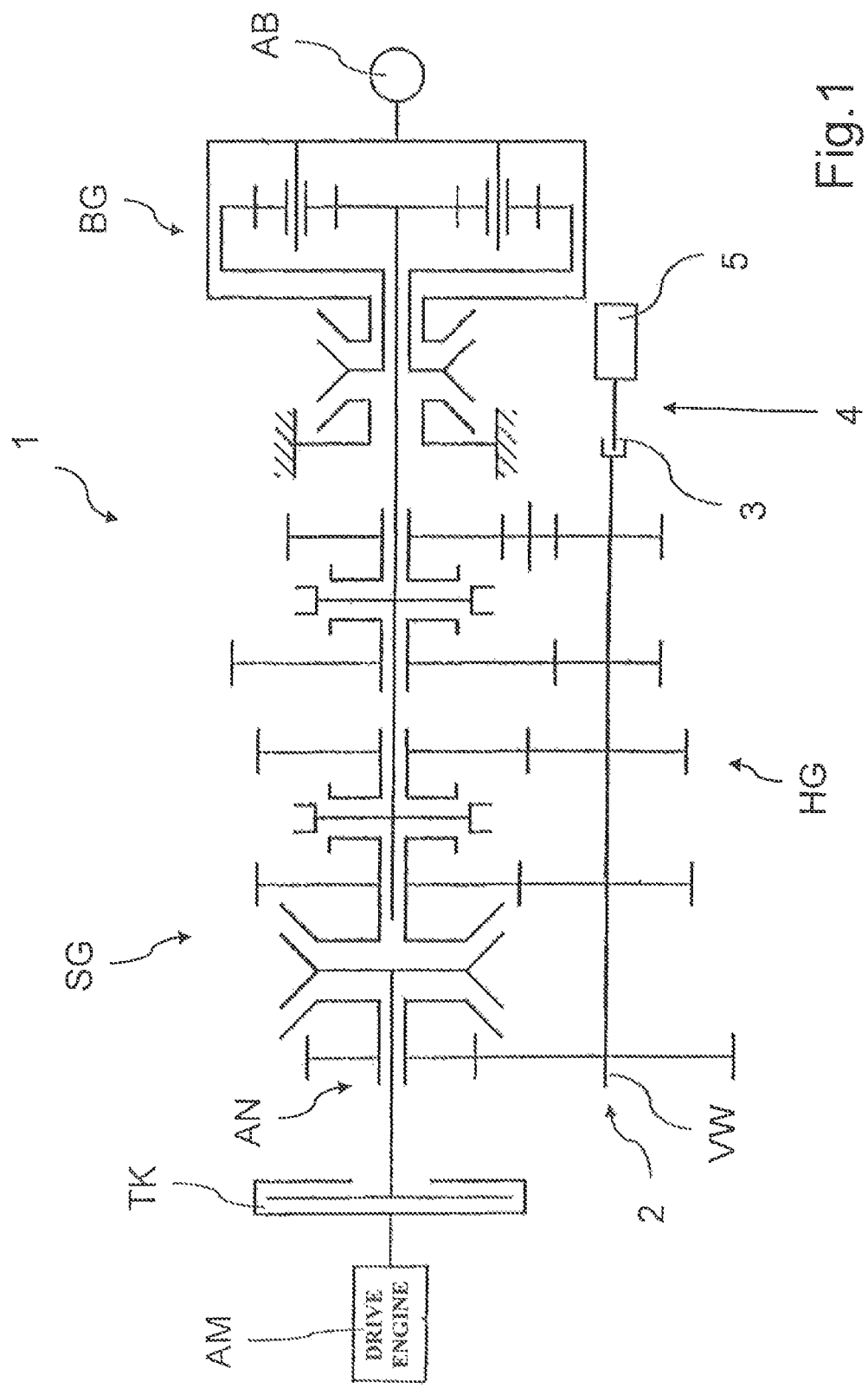
FIG. 1 shows a schematic view of a part of a drive train according to the invention comprising a motor vehicle transmission of group design.

FIG. 1 shows a schematic view of a part of a drive train of a commercial vehicle according to a preferred embodiment of the invention. In this drive train, a drive engine AM in the form of an internal combustion engine can be connected on the output side, via an intermediate separating clutch TK, to a drive side AN of a motor vehicle transmission 1. The motor vehicle transmission 1 is designed as a group type automatic transmission and comprises an unsynchronized main group HG, a synchronized splitter group SG upstream of the main group HG, and a synchronized range group BG downstream of the main group HG. The range group BG is of planetary design, while the splitter group SG and the main group HG are formed by individual spur-gear stages, which, in the case of the main group HG, can each be incorporated into a power flow via unsynchronized claw clutches, and in the case of the splitter group SG, can each be incorporated into a power flow via locking synchronization and can thereby define different gears of the motor vehicle transmission 1. As a result, a drive motion of the drive engine AM can be transferred accordingly—with the separating clutch TK engaged—via the splitter group SG, the main group HG, and the range group BG, to an output side AB of the motor vehicle transmission 1, at which subsequent components of the drive train of the commercial vehicle are connected, wherein said components have been known for a long time to a person skilled in the art.

As is also evident from FIG. 1, the splitter group SG and the main group HG comprise a common countershaft 2, wherein a form-locking shift element 3 is provided at one end of a countershaft-shaft VW of this countershaft 2 for the connection of a power take-off drive, via which an auxiliary assembly 5 can be driven. The shift element 3 is designed as a claw clutch in the present case, which, in an engaged state, couples a drive of the auxiliary assembly 5 to the countershaft-shaft VW in a rotationally fixed manner. Control of the form-locking shift element 3 for the disengagement and engagement thereof is regulated via a non-illustrated transmission control of the motor vehicle transmission 1, which also controls, inter alia, gear shifts of the automatic transmission and which, over the course thereof, and in start-up procedures of the commercial vehicle, can also access a non-illustrated engine control device of the drive engine AM, and a separating clutch TK in an instructive manner.

Figure 2:
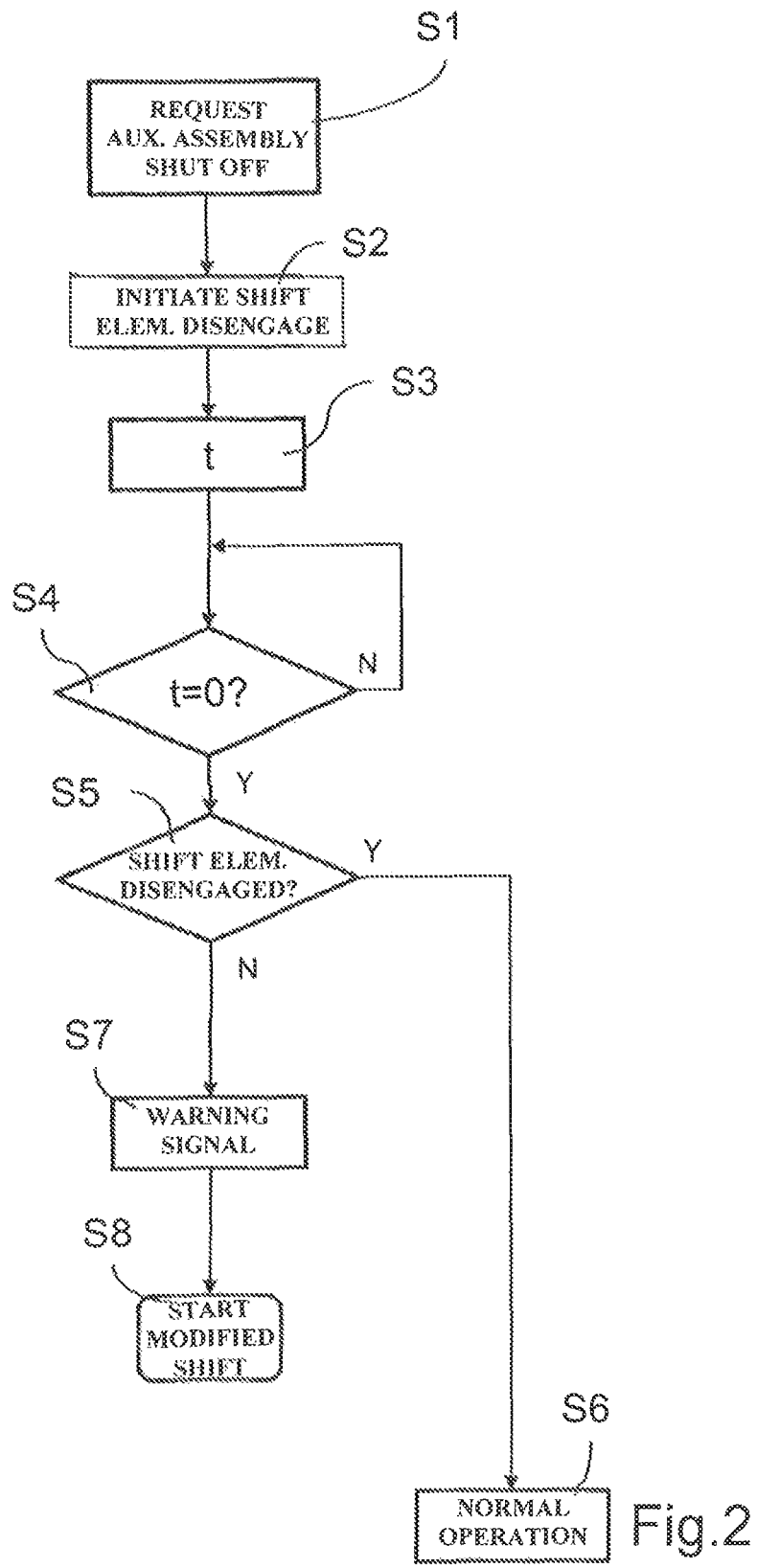
FIG. 2 shows a flow chart of a method according to the invention for decoupling a power take-off drive of the motor vehicle transmission shown in FIG. 1.
Figure 3:
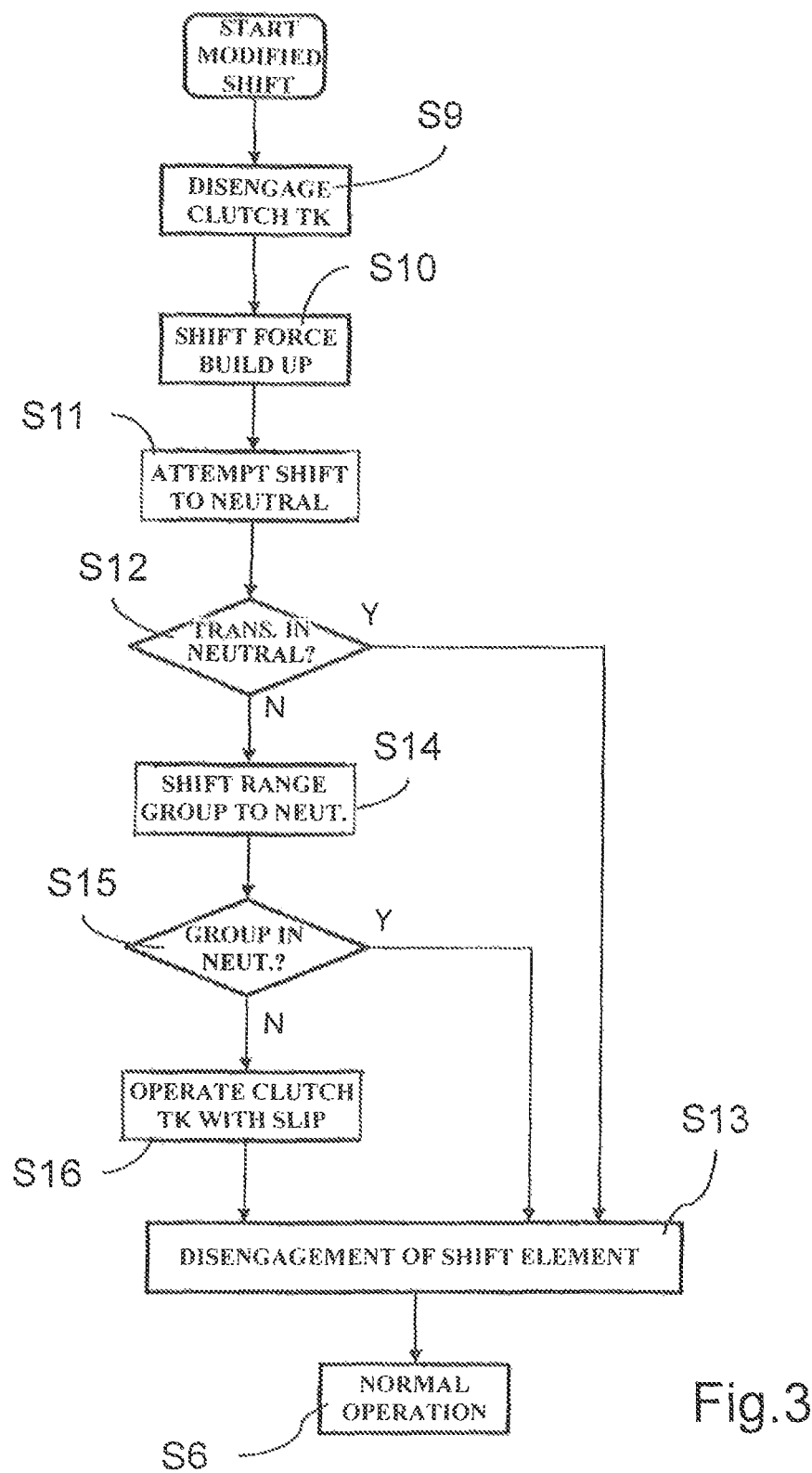
FIG. 3 shows a partial aspect of the method represented in FIG. 2 in detail corresponding to a first embodiment of the invention.

The power take-off drive is designed as a non-stationary power take-off drive in the present case, i.e. the auxiliary assembly 5 driven thereby can also be operated during travel of the commercial vehicle. In addition to coupling the power take-off drive 4, it is also possible, as a special feature, to decouple the power take-off drive during travel of the commercial vehicle. The transmission control thereby implements the method presented as a flow chart in FIG. 2, which will now be addressed with reference to FIG. 2 and FIG. 3, in which a detailed aspect of the method according to the invention is shown in greater detail:

At the beginning of the method, the power take-off drive 4 is coupled, and therefore the auxiliary assembly 5 is driven during travel of the commercial vehicle. A transmission ratio that is suitable for the operation of the auxiliary assembly 5 is selected in the motor vehicle transmission 1, wherein a gear shift is prevented from being implemented while the auxiliary assembly 5 is still engaged, to prevent shifting into different gear ratios that are unsuitable for the auxiliary assembly 5 in terms of an indicated rotational speed or a torque.

The method according to the invention is initiated by the transmission control when a vehicle driver of the commercial vehicle 1 requests, in a first step S1, that the auxiliary assembly 5 be shut off and, therefore, that the power take-off drive 4 be decoupled. In a step S2, the shift element 3 is then controlled so as to be disengaged. The separating clutch TK may also be controlled simultaneously via the transmission control in order to also disengage the separating clutch and decouple the motor vehicle transmission 1 from the drive engine AM. Since the commercial vehicle is still traveling, however, and, at the least, the countershaft-shaft VW and, therefore, the shift element 3 are still coupled to the output side AB of the motor vehicle transmission 1, the drive train is loaded due to the traction mode of the commercial vehicle or, if the separating clutch TK is disengaged, due to the ensuing thrust mode of the commercial vehicle, and therefore the shift element 3 is difficult to disengage.

Since a shifting force that can be applied to a shift element 3 is sufficient, under certain circumstances, to disengage the shift element without further measures, a time interval t is started in step S3 and the course thereof is checked in a step S4. The process always returns to before step S4 before the time interval t expires, whereas the process skips to step S5 after the time interval t expires.

In step S5, the transmission control inquires as to whether the shift element 3 was successfully disengaged and, therefore, whether the power take-off drive 4 was decoupled. If the answer is yes, the process skips directly to step S6, at which regulation of the motor vehicle transmission 1 is continued in a normal manner and the method according to the invention is aborted. If the answer in step S5 regarding successful disengagement is no, however, further control of the shift element 3 is initially interrupted and, in step S7, the output of a warning signal to the vehicle driver and the switch to emergency operation of the motor vehicle transmission 1 is suppressed. Operation of the commercial vehicle then continues, in the gear of the motor vehicle transmission 1 that is permissible in this case, with the power take-off drive 4 coupled, until a gear shift must be implemented in the motor vehicle transmission 1, due either to the vehicle driver implementing a shift or due to a requirement by the transmission control. Starting at this point, a modified gear shift in the motor vehicle transmission 1 is initiated with step S8, which is now described in detail with reference to FIG. 3.

A subsequent gear shift in the motor vehicle transmission 1 is initiated in step S9 by disengaging the separating clutch TK in order to separate the drive side AN of the motor vehicle transmission 11 from the drive engine AM. This step itself, which must also be implemented in the case of a conventional gear shift due to the unsynchronized main group HG, results in a certain relief of the drive train, and therefore it may be possible to disengage the shift element 3 even at this point.

In a subsequent step S10, a maximum pressure and, therefore, a maximum shift force is built up in a transmission actuator by the main pressure regulation via the transmission control. An attempt is then made in step S11 to shift the main transmission HG into neutral with a maximum shift force, which is not sufficient, under certain conditions, due to the drag torque of the auxiliary assembly 5 being added to the drag torque of the vehicle. In step S12, a query is then made as to whether the main transmission HG was successfully shifted into neutral. If the answer is yes, the process jumps directly to step S13, in which the shift element 3 is controlled once more so as to disengage. Since, with respect to the arrangement of the power take-off drive 4, a coupling to the output side AB is interrupted due to the separating clutch TK and a connection to the drive engine AM being disengaged, and due to the main transmission HG being in neutral, the drive train is relieved in the region of the countershaft-shaft VW to the extent that the shift element 3 can be disengaged. The process then returns to step S6 and normal shifting activity of the motor vehicle transmission 1 and usual operation are continued.

If the answer regarding the shift into neutral in step S12 is no, the process skips to step S14, in which the range group BG is also shifted into neutral with maximum shift force. Since lesser shift forces are usually necessary in the region of the range group, the chance is greater here that a shift into neutral can be implemented even though the auxiliary assembly 5 is still being driven. In step S15, a check is then carried out to determine whether the shift into neutral in the range group BG was successful. If the answer is yes, the process returns to step S13 and renewed control of the shift element 3 is completed.

If the range group BG could not be shifted into neutral, regulated engagement of the separating clutch TK is implemented in step S16. In this case, the separating clutch TK is actuated and operated in a slip mode such that a drive torque is transferred to the drive side AN of the motor vehicle transmission, which compensates for a drag torque of the vehicle and auxiliary assembly 5 calculated by the transmission control. As a result, the drive train is shifted in a virtually load-free manner, thereby making it possible to easily implement a shift into neutral in the main group HG and disengage the shift element 3. If an idle torque of the drive engine AM is insufficient, the transmission control accesses the engine control device during the course of the engine control taking place during the gear shift and indirectly implements a greater engine torque. After a corresponding drive torque from the engine has been set via the slipping separating clutch TK, the renewed control of the shift element 3 is completed in step S13 and, once the shift element is disengaged, the process skips to step S6.

Figure 4:
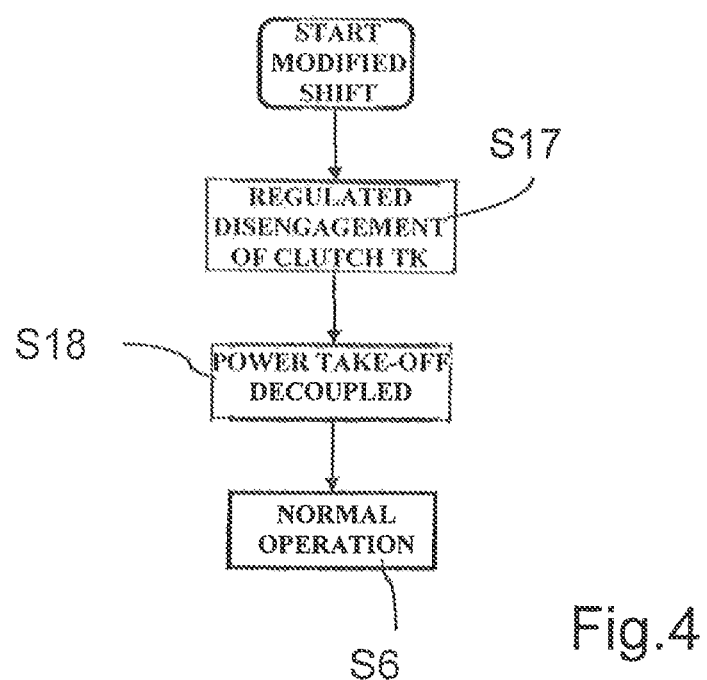
FIG. 4 shows a partial aspect of the method represented in FIG. 2 in detail corresponding to an alternative embodiment of the invention.

FIG. 4 shows another alternative development of the method following step S8. Unlike the variant described above and shown in FIG. 3, the separating clutch TK is disengaged in a regulated manner, in step S17, in a subsequent gear shift in the motor vehicle transmission, i.e. a drive torque is applied once more at the drive side AN by a corresponding slip mode of the separating clutch TK, the drive torque compensating for a calculated drag torque of the vehicle and the auxiliary assembly 5. As a result, a virtually load-free drive train is obtained, whereupon, in step S18, renewed control of the shift element 3 is implemented and the power take-off drive 4 can be decoupled. The process then returns to step S6 and, therefore, conventional operation of the motor vehicle transmission 1.

By means of a method according to the invention, a power take-off drive can be easily decoupled even during travel of a motor vehicle.

REFERENCE CHARACTERS

1 motor vehicle transmission
2 countershaft
3 shift element
4 power take-off drive
5 auxiliary assembly
AM drive engine
TK separating clutch
HG main group
SG splitter group
BG range group
AN drive side
AB output side
VW countershaft-shaft
t time interval
S1 to S18 individual method steps

The invention claimed is:
1. A method of decoupling a power take-off drive (4) of a motor vehicle transmission (1) during travel of a motor vehicle, in which a form-locking shift element (3) is controlled to disengage the power take-off drive (4), the method comprising the steps of:
 initiating control of the shift element, with a transmission control device, to disengage of the shift element,
 checking, with the transmission control device, whether the shift element is disengaged, if the shift element (3) is not disengaged, implementing, with the transmission control device, further control of the shift element (3) for decoupling the power take-off drive when at least one of:
- a separating clutch (TK), located between the motor vehicle transmission (1) and a drive engine (AM) of the motor vehicle, is actuated, and
- a connection of the shift element (3), toward an output side (AB) of the motor vehicle transmission (1), is interrupted during a subsequent gear shift in the motor vehicle transmission (1), and further controlling the shift element, with the transmission control unit, to disengage the shift element and decouple the power take-off drive when at least one of the separating clutch is actuated and the connection between the shift element and the output side of the motor vehicle transmission is interrupted.

2. The method according to claim 1, further comprising the step of, after the shift element (3) is initially controlled for a first time, checking, with transmission control device, whether the shift element is disengaged and, if the shift element (3) is not initially disengaged, interrupting control of the shift element, with the transmission control device, for a time and immediately reimplementing control of the shift element, with the transmission control device, when at least one the separating clutch (TK) is next actuated and the connection of the shift element (3) toward the output side of the motor vehicle transmission is interrupted.

3. The method according to claim 2, further comprising the step of, between the initial control of the shift element (3) for the first time and checking disengagement of the shift element, waiting for a time interval (t) to lapse before reimplementing control of the shift element.

4. The method according to claim 1, wherein the motor vehicle transmission (1) has a group design and the shift element (3) is disposed in a countershaft (2) of a main group (HG), the method further comprising the step of during the subsequent gear shift, implementing, with the transmission control device, a shift into neutral in at least one of the main group (HG) and a range group (BG) of the motor vehicle transmission (1) disposed downstream of the main group (HG).

5. The method according to claim 1, further comprising the step of setting, with the transmission control device, a shift force to a maximum shift force during the subsequent gear shift.

6. The method according to claim 1, further comprising the step of engaging the separating clutch (TK), with the transmission control device, during a subsequent actuation, in a regulated manner up to a point that a drive torque compensates for a drag torque.

7. The method according to claim 1, further comprising the step of disengaging the separating clutch (TK), with the transmission control device, during a subsequent actuation, in a regulated manner up to a point that a drive torque compensates for a drag torque.

8. A drive train of a motor vehicle comprising:
a motor vehicle transmission (1) having at least one power take-off drive (4) that is drivable, via a shift element, during travel of the motor vehicle, the at least one power take-off drive (4) being disconnectable during, travel of the motor vehicle, by a method in which the shift element is a form-locking shift element (3) and is controlled, by a transmission control device, to disengage the power take-off drive (4), the method comprising the steps of:

the transmission control device initiates controlling the shift element to disengage the shift element and decouple the power take-off drive from the motor vehicle transmission,
the transmission control device determining whether or not the shift element is disengaged, if the transmission control device determines that the shift element (3) did not disengage initially, then the transmission control device initiates further control of the shift element (3) when at least one of:
- a separating clutch (TK), located between the motor vehicle transmission (1) and a drive engine (AM) of the motor vehicle, is actuated, and
- a connection of the shift element (3), toward an output side (AB) of the motor vehicle transmission (1), is interrupted during a subsequent gear shift in the motor vehicle transmission (1), and the transmission control device further controlling the shift element to disengage the shift element and decouple the power take-off from the motor vehicle transmission.

9. The drive train according to claim 8, wherein the transmission control device comprises a computer program product which implements the method for decoupling the power take-off drive (4) of the motor vehicle transmission (1) by transmitting control commands stored in software contained within the computer program product with which the transmission control device controls engaging and disengaging of the shift element to couple and decouple the power take-off drive from the motor vehicle transmission.

10. The drive train according to claim 9, wherein a data carrier carries the computer program product.

11. A method of decoupling a power take-off drive (4) of a motor vehicle transmission (1) during travel of a motor vehicle, the motor vehicle transmission has a form-locking shift element (3) which is controllable for coupling and decoupling the power take-off drive, the form-locking shift element being couplable to drive the power take-off drive which drives and auxiliary assembly and decouplable to stop driving the power take-off drive and the auxiliary assembly, the method comprising the steps of:
initiating, with a transmission control device, the method of decoupling the power take-off drive while the motor vehicle is traveling, and when the form-locking shift element is coupling and driving the power take-off drive and the auxiliary assembly, and when a driver requests stopping drive to the auxiliary assembly;
controlling, with the transmission control device, the form-locking shift element to disengage and decouple the power take-off drive;
determining, with the transmission control device, if the form-locking shift element is disengaged;
if the form-locking shift element is disengaged, then, with the transmission control device, terminating the method of decoupling the power take-off drive;
if the form-locking shift element is determined to be engaged, immediately implementing, with the transmission control device, further control of the shift element when at least one of:
- a separating clutch, located between the motor vehicle transmission and a drive engine of the motor vehicle, is actuated, and
- a connection of the shift element toward an output side of the motor vehicle transmission is interrupted during a subsequent gear shift in the motor vehicle transmission; and further controlling the form-locking shift element, with the transmission control device, to disengage and decouple the power take-off drive and the auxiliary assembly when at least one of the separating clutch is actuated and the connection between the shift element and the motor vehicle transmission is interrupted.

* * * * *